n(12) United States Patent
Su et al.

(10) Patent No.: US 9,762,080 B2
(45) Date of Patent: Sep. 12, 2017

(54) ELECTRONIC APPARATUS, SYSTEM AND CHARGING METHOD THEREOF

(71) Applicant: HTC Corporation, Taoyuan County (TW)

(72) Inventors: Chih-Chin Su, Taoyuan County (TW); Chien-Ting Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 692 days.

(21) Appl. No.: 13/925,810

(22) Filed: Jun. 24, 2013

(65) Prior Publication Data

US 2014/0375254 A1    Dec. 25, 2014

(51) Int. Cl.
| | |
|---|---|
| H02J 7/00 | (2006.01) |
| H02J 7/02 | (2016.01) |
| H02J 17/00 | (2006.01) |
| H04B 5/00 | (2006.01) |

(52) U.S. Cl.
CPC .............. *H02J 7/025* (2013.01); *H02J 17/00* (2013.01); *H04B 5/0037* (2013.01)

(58) Field of Classification Search
CPC .................................................... H02J 7/0029
USPC ........................................ 320/108; 307/104
See application file for complete search history.

(56) References Cited

U.S. PATENT DOCUMENTS

| | | | | |
|---|---|---|---|---|
| 7,633,263 B2* | 12/2009 | Toya | ....................... | H02J 7/025 320/103 |
| 2010/0320962 A1* | 12/2010 | Sekita | ..................... | H02J 7/025 320/108 |
| 2011/0298419 A1* | 12/2011 | Tsai | ...................... | H01M 10/46 320/108 |
| 2012/0280648 A1* | 11/2012 | Hwang | ................. | H02J 7/0013 320/108 |

FOREIGN PATENT DOCUMENTS

JP    WO 2013069472 A2 *   5/2013   ............. H02J 5/005

* cited by examiner

*Primary Examiner* — Drew A Dunn
*Assistant Examiner* — Zixuan Zhou
(74) *Attorney, Agent, or Firm* — Jianq Chyun IP Office

(57) ABSTRACT

The invention provides electronic apparatus includes an antenna, a switch, a power generator, a battery, and a controller. The antenna receives a wireless signal. The switch transports the wireless signal to a first terminal or a second terminal according to a mode selecting signal. The power generator is coupled to the second terminal for receiving the wireless signal. The power generator generates a charging power according to the wireless signal. The charging power is provided to charge the battery. The controller generates the mode selecting signal by detecting the electronic apparatus is in a non-operation mode or not.

16 Claims, 3 Drawing Sheets

ELECTRONIC APPARATUS, SYSTEM AND CHARGING METHOD THEREOF

BACKGROUND OF THE INVENTION

Field of Invention

The present invention generally relates to an electronic apparatus, and more particularly to a charging system and method for the electronic apparatus.

Description of Prior Art

Along with the rapid development of science and technology at the present, hand-held electronic apparatus (such as mobile phone, tablet computer, and notebook) are widespread used. Since almost all of the hand-held electronic apparatus operate base on a power from battery. It is important to provide a convenience charging method to charge the batteries of the electronic apparatus for keeping the electronic apparatus in use.

Wireless charging is one of the most popular topics for a hand-help apparatus recently. It can make the hand-help apparatus to have battery charging without any cable. In prior art, wireless charging system uses a magnetic induction technology which has two coils. One of the coils is used to be a transmitter, and another one is used to be a receiver. A current flows through the transmitter for generating a magnetic field which can induce a current or a voltage in the receiver. The current or voltage in the receiver can be converted to a charging power to charge a battery in the hand-help apparatus.

However, the coil in the receiver of the hand-help electronic apparatus is not easy to implement due to the dimension and some design limitations. A large area on the hand-help electronic apparatus for disposing the coil is needed, and a slim form factor design is difficult for the hand-help electronic apparatus.

SUMMARY OF THE INVENTION

The present invention provides an electronic apparatus and system, and the electronic apparatus is able to have metallic and slim form factor design.

The present invention provides a charging method for the apparatus, and the electronic apparatus is able to have metallic and slim form factor design.

The electronic apparatus includes an antenna, a switch, a power generator, a battery, and a controller. The antenna receives a wireless signal. The switch is coupled to the antenna, and receives the wireless signal. The switch transports the wireless signal to a first terminal or a second terminal according to a mode selecting signal. The power generator is coupled to the second terminal for receiving the wireless signal. The power generator generates a charging power according to the wireless signal. The battery is coupled to the power generator, and the charging power is provided to charge the battery. The controller is coupled to the switch and generates the mode selecting signal by detecting the electronic apparatus is in a non-operation mode or not.

In an embodiment of the disclosure, when the controller detects the electronic apparatus is in the non-operation mode, the controller generates the mode selecting signal to control the switch to transport the wireless signal to the second terminal.

In an embodiment of the disclosure, when the controller detects the electronic apparatus is not in the non-operation mode, the controller generates the mode selecting signal to control the switch to transport the wireless to the first terminal.

In an embodiment of the disclosure, the electronic apparatus further includes a core circuit, and the core circuit is coupled to the first terminal.

In an embodiment of the disclosure, wherein the power generator includes a rectifier and a power manager. The rectifier is coupled to the second terminal, the rectifier receives the wireless signal through the second terminal and rectifies the wireless signal to generate a rectified signal. The power manager is coupled to the rectifier, the power manager receives the rectified signal and converts rectified signal to generate the charging power.

In an embodiment of the disclosure, the electronic apparatus further includes a universal serial bus connector. The universal serial bus connector is coupled to the power generator. The universal serial bus connector provides an external power to the power generator.

In an embodiment of the disclosure, wherein the power generator is further coupled to the controller for receiving a charging command from the controller. The power generator selects the external power or the charging power to charge the battery according to the charging command.

The electronic system includes an accessory and a hand-held electronic apparatus. The accessory provides a wireless signal through a first antenna. The hand-held electronic apparatus includes a second antenna, a switch, a power generator, a battery, and a controller. The second antenna receives a wireless signal. The switch is coupled to the antenna, and receives the wireless signal. The switch transports the wireless signal to a first terminal or a second terminal according to a mode selecting signal. The power generator is coupled to the second terminal for receiving the wireless signal. The power generator generates a charging power according to the wireless signal. The battery is coupled to the power generator, and the charging power is provided to charge the battery. The controller is coupled to the switch and generates the mode selecting signal by detecting the electronic apparatus is in a non-operation mode or not.

The charging method is adaptable for an electronic apparatus. The steps of the charging method includes: receiving a wireless signal through an antenna of the electronic apparatus; generating a mode selecting signal by detecting the electronic apparatus being in a non-operation mode or not; transporting the wireless signal to a first terminal or a second terminal according to the mode selecting signal; generating a charging power according to the wireless signal received from the second terminal; and providing the charging power to charge a battery of the electronic apparatus.

Accordingly, the electronic apparatus receives the wireless signal from the antenna on the electronic apparatus. That is, the original radio-frequency and charging function can be co-existence. By present disclosure, the electronic apparatus is able have metallic and slim form factor design.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

Figure 1:
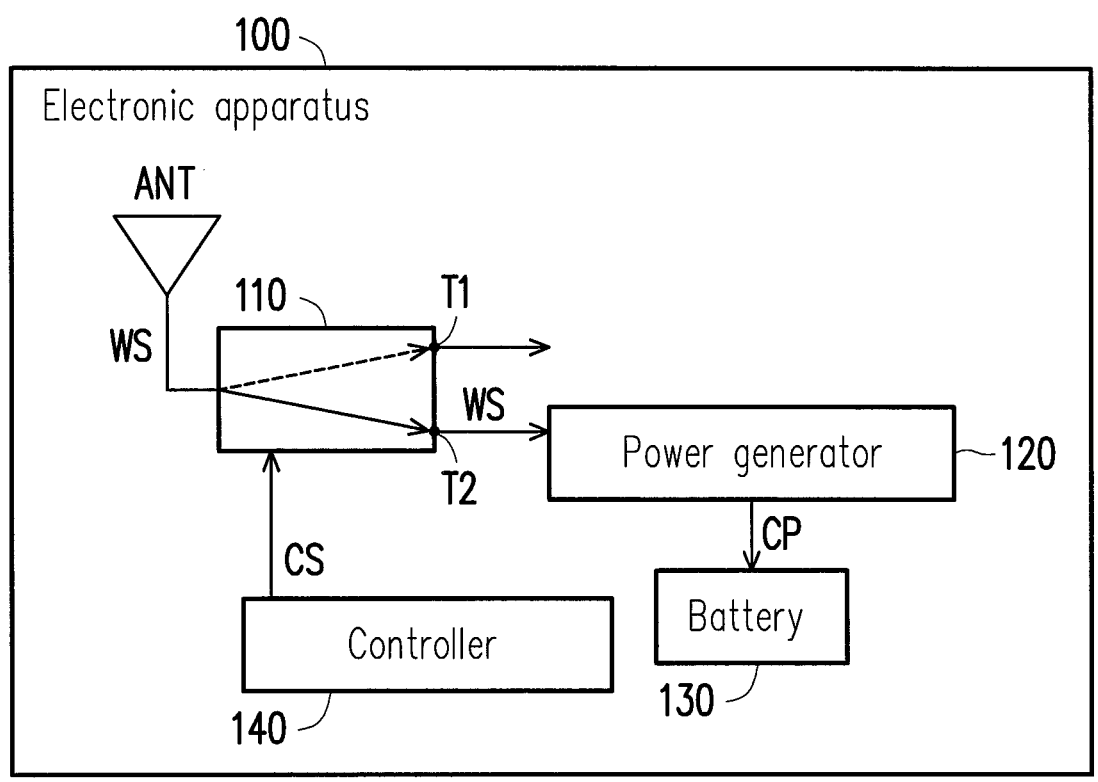
FIG. 1 is a block diagram of an electronic apparatus according to an embodiment of present disclosure.

Reference will now be made in detail to the present preferred embodiment of the invention, examples of which are illustrated in the accompanying drawings. Wherever possible, the same reference numbers are used in the drawings and the description to refer to the same or like parts.

Please referring to FIG. 1, FIG. 1 is a block diagram of an electronic apparatus according to an embodiment of present disclosure. The electronic apparatus 100 includes an antenna ANT, a switch 110, a power generator 120, battery 130 and controller 140. The antenna ANT is used to receive a wireless signal WS, and the antenna ANT may be a phone, WIFI (Wireless Fi-delity) or GPS (Global Position System) antenna. The wireless signal WS may be a radio-frequency (RF) signal. The switch 110 is coupled to the antenna ANT, and receives the wireless signal WS form the antenna ANT. The switch 110 is further coupled to the controller 140, and the switch 110 receives a mode selecting signal CS from the controller 140. Moreover, the switch 110 has a first terminal T1 and a second terminal T2, and the switch 110 transports the wireless signal WS to the first terminal T1 or the second terminal T2 according to the mode selecting signal CS. The electronic apparatus 100 may be a hand-held electronic apparatus.

The power generator 120 is coupled to the second terminal T2 of the switch 110. The power generator 120 receives the wireless signal WS through the second terminal T2 when the switch 110 transporting the wireless signal WS to the second terminal T2. The power generator 120 generates a charging power CP according to the wireless signal WS. The charging power CP is provided to the battery 130, wherein, the battery 130 is coupled to the power generator 120. The charging power CP is used for charging the battery 130.

The controller 140 is coupled to the switch 110. The controller 140 generates the mode selecting signal CS by detecting the electronic apparatus 100 is in a non-operation mode or not. In detail, when the electronic apparatus 100 is in the non-operation mode, the mode selecting signal CS generated by the controller 140 indicates the switch 110 to transport the wireless signal WS to the second terminal T2. On the contrary, when the electronic apparatus 100 is not in the non-operation mode, the mode selecting signal CS generated by the controller 140 indicates the switch 110 to transport the wireless signal WS to the first terminal T1.

Please notice here, the controller 140 may detect whether the electronic apparatus 100 is in the non-operation mode or not by a signal receives from an antenna. The signal may be the wireless signal WS received form the antenna ANT, or the signal may be another wireless signal received from another antenna (not illustrated in FIG. 1). The non-operation mode is a sleep mode, a standby mode, or a function off mode.

In detail, when the controller 140 detects the electronic apparatus 100 be in the non-operation mode, the controller 140 generates the mode selecting signal CS and transports the mode selecting signal CS to the switch 110. The switch 110 transports the wireless signal WS received from the antenna ANT to the second terminal T2 according to the mode selecting signal CS. Then, the power generator 120 receives the wireless signal WS through the second terminal T2, and converts the wireless signal WS to the charging power CP. The charging power CP is provided to the battery 130 for charging. When the electronic apparatus 100 is no more in the non-operation mode and detected by the controller 140, the controller 140 changes the status of the mode selecting signal CS correspondingly. Moreover, the switch 110 switches the wireless signal WS to transport to the first terminal T1. Wherein, the first terminal T1 is coupled to a core circuit of the electronic apparatus 100, and the core circuit is used to operate normal functions (such as phone call) of the electronic apparatus 100. The charging operation for the battery 130 is stopped at this time.

Figure 2:
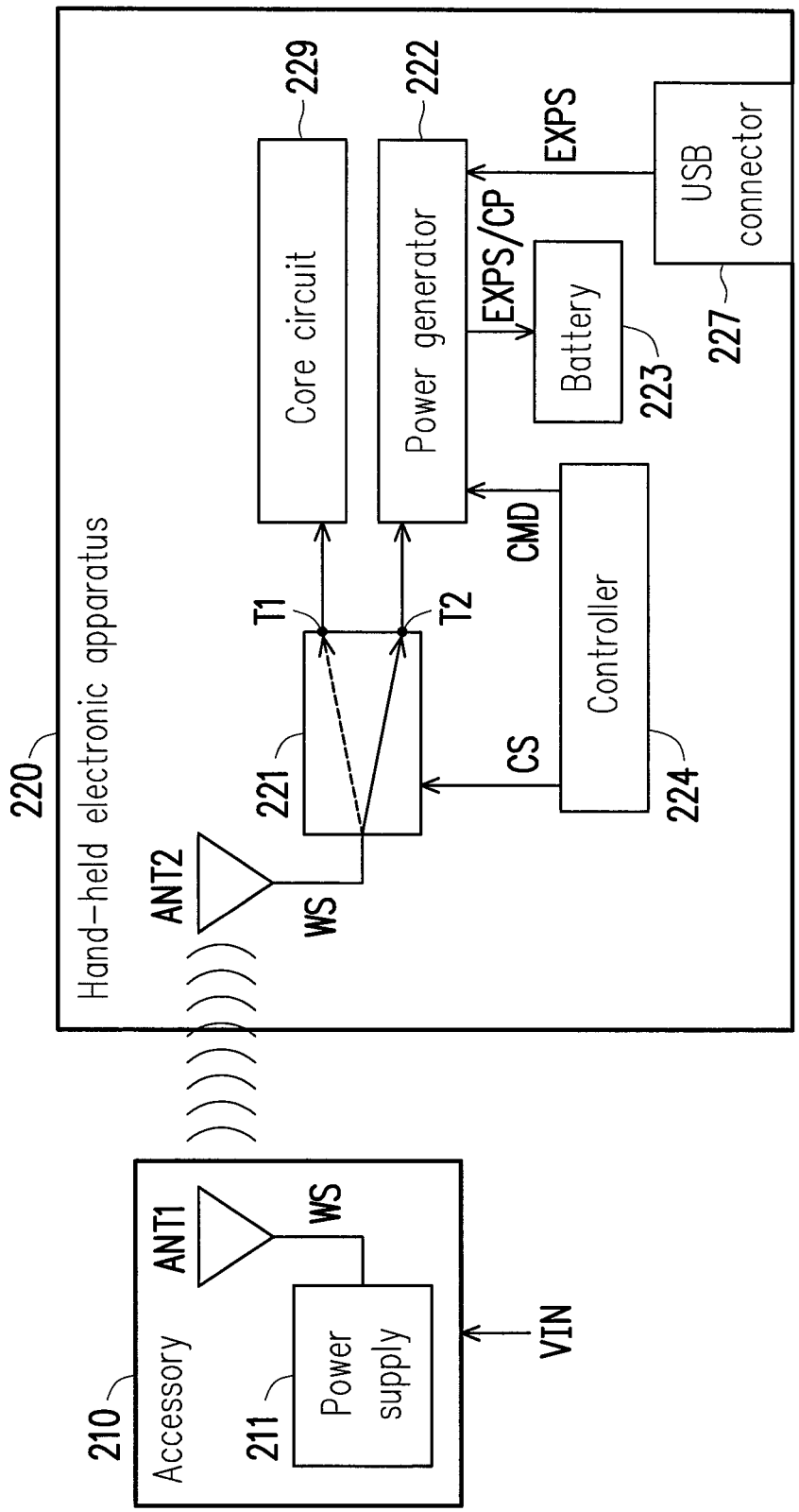
FIG. 2 is a block diagram of an electronic system according to an embodiment of the present disclosure.

Please referring to FIG. 2, FIG. 2 is a block diagram of an electronic system according to an embodiment of the present disclosure. The electronic system 200 includes an accessory 210 and a hand-held electronic apparatus 220. The accessory 210 includes a power supply 211 and an antenna ANT1. The power supply 211 is used to receive a voltage VIN and converts the voltage VIN to a wireless signal WS. The wireless signal WS may be transported to the antenna ANT1 and the antenna ANT1 transports the wireless signal WS out wirelessly. The voltage VIN maybe an alternative current (AC) voltage or a direct current (DC) voltage.

The hand-help electronic apparatus 220 includes an antenna ANT2, a switch 221, a power generator 222, a battery 223, a controller 224, a universal serial bus (USB) connector 227, and a core circuit 229. When the antenna ANT2 is coupled to the antenna ANT1, the antenna ANT2 receives the wireless signal WS from the antenna ANT1. The switch 221 is coupled to the antenna T2 for receiving the wireless signal WS, and the switch 221 decides to transport the wireless signal WS to the first terminal T1 or the second terminal T2 according to the mode selecting signal CS. When the switch 221 decides to transport the wireless signal WS to the first terminal T1, the wireless signal WS is received by the core circuit 229. On the contrary, when the switch 221 decides to transport the wireless signal WS to the second terminal T2, the wireless signal WS is received by the power generator 222. The core circuit 229 is used to operate the normal functions of the hand-held electronic apparatus 220. The power generator 222 is used to generate a charging power CP according to the wireless signal WS.

The controller 224 is coupled to the switch 221 and the power generator 222. The controller 224 generates the mode selecting signal CS by detecting whether the hand-held electronic apparatus 220 is in non-operation mode or not. Furthermore, the controller 224 further transports a charging command CMD to the power management.

Please notice here, the power generator 222 is further coupled to the USB connector 227. The USB connector 227 may transport an external power EXPS to the power generator 222. The power generator 222 may select one of the external power EXPS and the charging power CP to charge the battery 223 according to the charging command CMD.

In detail, when the USB connector 227 is connected to an external host, the external host may provide the external power EXPS to the USB connector 227. The controller 224 may detect the connection status of the USB connector 227, and the controller 224 generates the charging command CMD to indicate the power generator 222 to provide the external power EXPS to charge the battery 223 when the USB connector 227 is connecting to the external host. On the contrary, when the USB connector 227 is isolated from the external host, the controller 224 may changes the charging command CMD to indicate the power generator 222 to provide the charging power CP to charge the battery 223.

Figure 3:
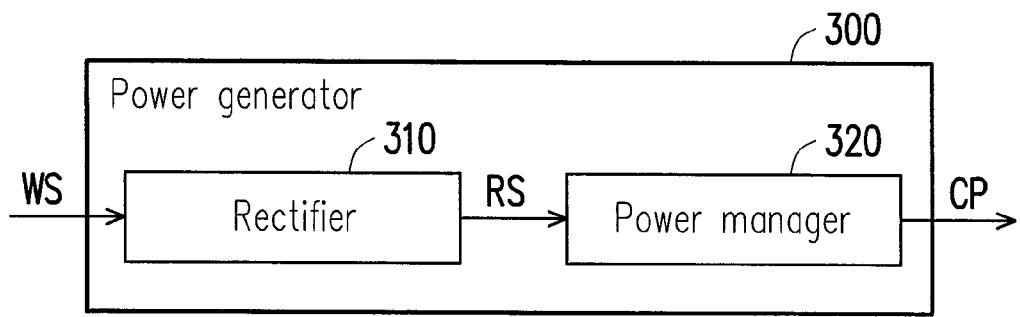
FIG. 3 is a block diagram of the power generator according to the embodiments mentioned above of present disclosure.

Please referring to FIG. 3, FIG. 3 is a block diagram of the power generator according to the embodiments mentioned above of present disclosure. The power generator 300 includes a rectifier 310 and a power manager 320. The rectifier 310 receives the wireless signal WS, and the rectifier 310 rectifies the wireless signal WS to generate a rectified signal RS. The rectifier 310 is coupled to the power manager 320, and the rectifier 310 transports the rectified signal RS to the power manager 320. The power manager 320 may convert the rectified signal RS to a charging power CP, and the power manager 320 may decide to provide the charging power CP to charge a battery.

Figure 4:
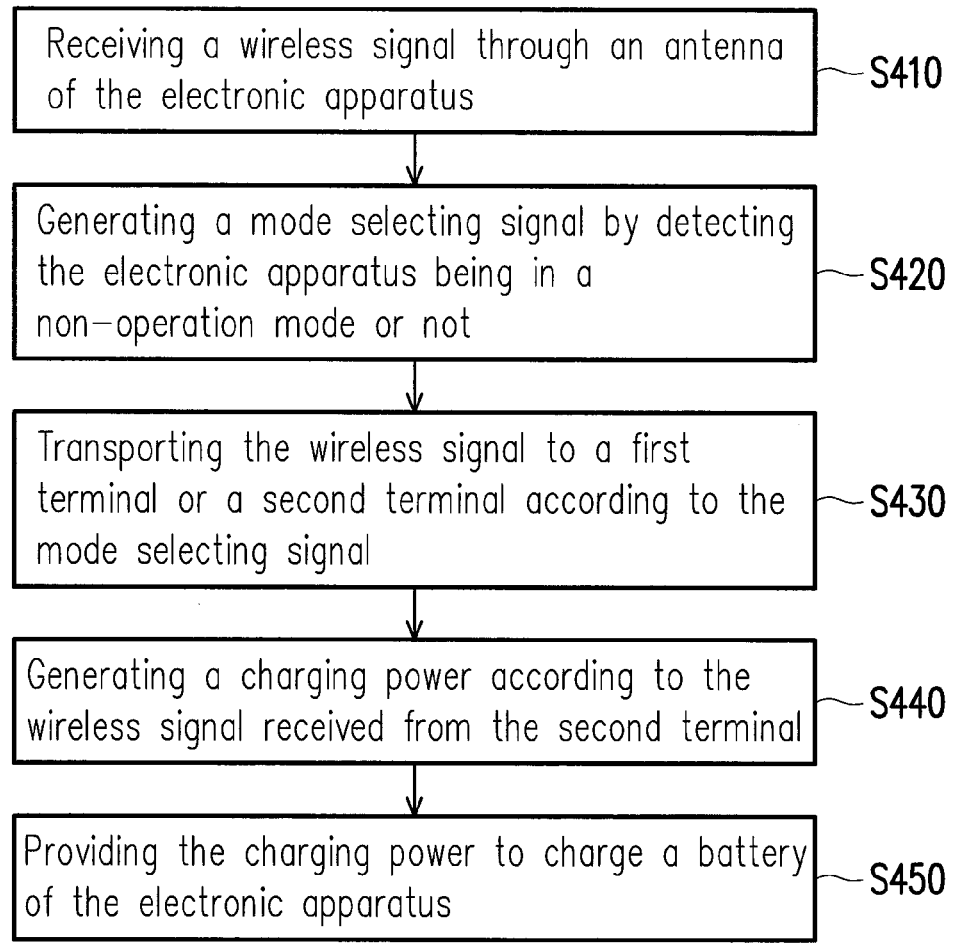
FIG. 4 is a flow chart of a charging method according to an embodiment of present disclosure.

Please referring to FIG. 4, FIG. 4 is a flow chart of a charging method according to an embodiment of present disclosure. The charging method is adapted for an electronic apparatus. In step S410, a wireless signal is received through an antenna of the electronic apparatus. A mode selecting signal is generated by detecting whether the electronic apparatus is in a non-operation mode or not, in step S420. Further, in step S430, the wireless signal is transported to a first terminal or a second terminal according to the mode selecting signal, and when the wireless signal is transported to the second terminal, a charging power is generated according to the wireless signal received from the second terminal in step S440. Moreover, the charging power generated in step S440 is provided to a battery of the electronic apparatus for charging the battery in step S450.

Operation details of the charging method of the present embodiment have been described in detail in the aforementioned embodiment with reference of the electronic apparatus and the electronic system, so that detailed descriptions thereof are not repeated.

In summary, in the disclosure of present application, the electronic apparatus receives the wireless signal for charging the battery through the antenna of the electronic apparatus. That is, a coil in the electronic apparatus for charging purpose is not necessary. In this condition, the electronic apparatus is able to have metallic and slim form factor design.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
   an antenna, receiving a wireless signal;
   a switch, coupled to the antenna, and receiving the wireless signal, the switch transporting the wireless signal to merely one of a first terminal and a second terminal according to a mode selecting signal;
   a power generator, coupled to the second terminal for receiving the wireless signal, the power generator generating a charging power according to the wireless signal;
   a battery, coupled to the power generator, and the charging power being provided to charge the battery; and
   a controller, coupled to the switch, generating the mode selecting signal by detecting the electronic apparatus being in a non-operation mode or not, wherein the non-operation mode is a sleep mode, a standby mode, or a function off mode,
   wherein, when the electronic apparatus is in the non-operation mode during a first time period, the switch transports the wireless signal to the battery for a charging operation, and when the electronic apparatus changes to not in the non-operation mode during a second time period, the switch stops to transport the wireless signal to the battery and transports the wireless signal to a core circuit, wherein the core circuit is coupled to the first terminal,
   wherein, the first period and the second period is determined according to whether the wireless signal received by the antenna is used for a normal function of the electronic apparatus or not.

2. The electronic apparatus according to claim 1, wherein when the controller detects the electronic apparatus is in the non-operation mode, the controller generates the mode selecting signal to control the switch to transport the wireless signal to the second terminal.

3. The electronic apparatus according to claim 1, wherein when the controller detects the electronic apparatus is not in the non-operation mode, the controller generates the mode selecting signal to control the switch to transport the wireless to the first terminal.

4. The electronic apparatus according to claim 1, wherein the power generator comprises:
   a rectifier, coupled to the second terminal, the rectifier receives the wireless signal through the second terminal and rectifies the wireless signal to generate a rectified signal; and
   a power manager, coupled to the rectifier, the power manager receives the rectified signal and converts rectified signal to generate the charging power.

5. The electronic apparatus according to claim 1, further comprising:
   an universal serial bus connector, coupled to the power generator, the universal serial bus connector providing an external power to the power generator.

6. The electronic apparatus according to claim 5, wherein the power generator is further coupled to the controller for receiving a charging command from the controller, the power generator selects the external power or the charging power to charge the battery according to the charging command.

7. An electronic system, comprising:
   an accessory, providing a wireless signal through a first antenna; and
   a hand-held electronic apparatus, comprising:
      a second antenna, receiving the wireless signal;
      a switch, coupled to the second antenna, and receiving the wireless signal, the switch transporting the wireless signal to merely one of a first terminal and a second terminal according to a mode selecting signal;
      a power generator, coupled to the second terminal for receiving the wireless signal, the power generator generating a charging power according to the wireless signal;
      a battery, coupled to the power generator, and the charging power being provided to charge the battery; and
      a controller, coupled to the switch, generating the mode selecting signal by detecting the hand-held electronic apparatus being in a non-operation mode or not, wherein the non-operation mode may be a sleep mode, a standby mode, or a function off mode, wherein, when the electronic apparatus is in the non-operation mode during a first time period, the switch transports the wireless signal to the battery for a charging operation, and when the electronic apparatus changes to not in the non-operation mode during a second time period, the switch stops to transport the wireless signal to the battery and transports the wireless signal to a core circuit, wherein the core circuit is coupled to the first terminal, wherein, the first period and the second period is determined according to whether the wireless signal received by the antenna is used for a normal function of the electronic apparatus or not.

8. The electronic system according to claim 7, wherein when the controller detects the hand-held electronic apparatus is in the non-operation mode, the controller generates the mode selecting signal to control the switch to transport the wireless signal to the second terminal.

9. The electronic system according to claim 7, wherein when the controller detects the hand-held electronic apparatus is not in the non-operation mode, the controller generates the mode selecting signal to control the switch to transport the wireless to the first terminal.

10. The electronic system according to claim 7, wherein the power generator comprises:

a rectifier, coupled to the second terminal, the rectifier receives the wireless signal through the second terminal and rectifies the wireless signal to generate a rectified signal; and a power manager, coupled to the rectifier, the power manager receives the rectified signal and converts rectified signal to generate the charging power.

11. The electronic system according to claim 7, further comprising:

an universal serial bus connector, coupled to the power generator, the universal serial bus connector providing an external power to the power generator.

12. The electronic system according to claim 11, wherein the power generator is further coupled to the controller for receiving a charging command from the controller, the power generator selects the external power or the charging power to charge the battery according to the charging command.

13. A charging method, adaptable for an electronic apparatus, comprising:

receiving a wireless signal through an antenna of the electronic apparatus;

generating a mode selecting signal by detecting the electronic apparatus being in a non-operation mode or not, wherein the non-operation mode may be a sleep mode, a standby mode, or a function off mode;

transporting the wireless signal to merely one of a first terminal and a second terminal according to the mode selecting signal by a switch;

generating a charging power according to the wireless signal received from the second terminal; and providing the charging power to charge a battery of the electronic apparatus, wherein, when the electronic apparatus is in the non-operation mode during a first period, transporting the wireless signal to the battery for a charging operation by the switch, and when the electronic apparatus changes to not in the non-operation mode during a second period, stopping to transport the wireless signal to the battery and transporting the wireless signal to a core circuit by the switch, wherein the core circuit is coupled to the first terminal, wherein, the first period and the second period is determined according to whether the wireless signal received by the antenna is used for a normal function of the electronic apparatus or not.

14. The charging method according to claim 13, wherein when the detecting the electronic apparatus is in the non-operation mode, transporting the wireless signal to the second terminal.

15. The charging method according to claim 13, wherein when the detecting the electronic apparatus is not in the non-operation mode, transporting the wireless signal to the first terminal.

16. The charging method according to claim 13, further comprising:

receiving an external power from an universal serial bus connector of the electronic apparatus; and selecting the external power or the charging power to charge the battery according to a charging command.

* * * * *